3,085,955
PRODUCTION OF SULFUR COMPOUNDS
Rector P. Louthan, Bartlesville, Okla., assignor to Phillips Petroleum Company, a corporation of Delaware
No Drawing. Filed Dec. 1, 1958, Ser. No. 777,227
16 Claims. (Cl. 204—162)

This invention relates to a method for production of sulfur compounds. In a more particular aspect the invention relates to a method for promoting the reaction of unsaturated hydrocarbons with hydrogen sulfide or mercaptans in the presence of certain activating rays by including in the reaction mixture certain aryl thiols.

It is known to react unsaturated hydrocarbons with hydrogen sulfide or with a mercaptan in the presence of activating rays such as ultraviolet light or gamma rays. However, in many cases the time necessary for the reaction to reach completion or a desirable high conversion leaves something to be desired. It has been found that there is often an initial induction period during which the reaction is not proceeding or is proceeding at a very low rate.

It is, therefore, an object of the present invention to provide a method for promoting the reaction of unsaturated hydrocarbons with hydrogen sulfide or mercaptans. Other objects, as well as aspects and advantages, of the invention will become apparent upon a study of the accompanying disclosure.

According to the invention there is provided a process for promoting the reaction of certain unsaturated hydrocarbons with hydrogen sulfide or with a mercaptan in the presence of certain activating radiations by the step of including in the reaction mixture a benzene thiol or a naphthalenethiol or the alkyl derivatives thereof; the compounds embraced by the invention are, more particularly, of the formulas

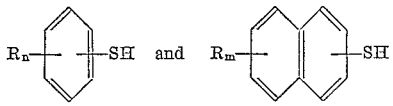

where R is an alkyl group containing 1 to 1 carbon atoms, $n$ is an integer from 0 to 5 and $m$ is an integer from 0 to 7, and wherein the compound contains a total of from 6 to 36 carbon atoms.

Examples of these promoters are illustrated by the following compounds:

Benzenethiol
2-methylbenzenethiol
4-methylbenzenethiol
3,5-diethylbenzenethiol
2-methyl-3-isopropylbenzenethiol
4-octylbenzenethiol
4-(2-methylheptyl)benzenethiol
3-decylbenzenethiol
2,3,5-tridecylbenzenethiol
2,3,4,5,6-pentamethylbenzenethiol
1-naphthalenethiol
2-naphthalenethiol
1,4-dimethyl-2-naphthalenethiol
1,3,6,8-tetraethyl-2-naphthalenethiol
2,8-dihexyl-1-naphthalenethiol
4-(2-ethylhexyl)-1-naphthalenethiol
1,6-didecyl-2-naphthalenethiol
1,3,4,5,6,7,8-heptamethyl-2-naphthalenethiol As to the reactants, the unsaturated hydrocarbons are acyclic or alicyclic hydrocarbons containing one or more nonconjugated multiple carbon-to-carbon bonds. Their chain length or molecular weight are unlimited; thus, the reactant unsaturated hydrocarbons include not only simple monoolefins, diolefins, triolefins, acetylenes, etc., but also poly-olefins and olefin polymers such as polymers of isobutylene, polymers of propylene, polybutadiene, copolymers of conjugated diolefins with isobutylene such as a copolymer of isoprene with isobutylene. Some other examples of specific compounds include ethylene; propylene; 1-butene; 2-butene; 1-pentene; 2-pentene; 1-hexene; 2-hexene; 1,4-hexadiene; cyclopentene; cyclohexene; pinene, dipentene, citrene, 4-methyl-1-pentene, 1-octene, 1-decene, 1-cetene, 3-methylcyclohexene; 1,4-pentadiene; 3,5-dimethyl-2-hexene; 1,5-hexadiene; acetylene; propyne; 1-butyne; 1-hexyne; octyl acetylene; 2-ethyl-1-hexene, diisobutylene; triisobutylene; 2,6-dodecadiene; 8-heptadecene; 3-butyl-1-docosene; cerotene; 1,9-decadiene, 2,3-dimethyl-1-butene; 2,3-dimethyl-1-octyne; 3,4-dipropyl-1-octene; 3-methyl-2-ethyl-1-butene; 2,6-dimethyl-1-heptene; 2,3,4,4-tetramethyl-1-decene; 2-methyl-1-butene; 3-methyl-1-butene; 2-methyl-2-butene; 3,3-dimethyl-1-butene; 2,3-dimethyl-2-butene; 2,3,3-trimethyl-1-pentene; 2,4,4-trimethyl-2-pentene; 3,3,4-trimethyl-1-pentene; 3,4,4-trimethyl-1-pentene; 3,4,4-trimethyl-2-pentene and 3,3-dimethyl-2-ethyl-1-butene.

The olefins most commercially important at the present time as the unsaturated hydrocarbon reactants are the open-chain monoolefins, both straight chain and branch chain, having from two to about sixteen carbon atoms.

As is well known, when hydrogen sulfide reacts with the unsaturated material it adds to a double or multiple bond to form a mercaptan. Also, part of the mercaptan formed, the amount depending on various factors especially the ratio of reactants, reacts with part of the olefin or other unsaturate to form a corresponding hydrocarbon thioether. It is also well known that when a mercaptan is used as a reactant instead of hydrogen sulfide, the reaction product is a thioether. Thus, as is well known, 1-butene reacts with n-butyl-mercaptan to form di-n-butyl thioether.

The mercaptan reactants employed can be any aliphatic or cycloaliphatic mercaptan, usually containing from 1 to 20 carbon atoms, although the invention is applicable to mercaptans containing more carbon atoms. One or more of such mercaptans can be employed simultaneously, of course; particularly for the higher members, the compounds employed often are a mixture of isomers. Some examples of such mercaptans include methanethiol, ethanethiol, n-propanethiol, tert-butanethiol, octanethiol, cyclooctanethiol, heptadecanethiol, eicosanethiol, 2-propenethiol, 4-octenethiol, 2,4,6-triethyloctanethiol, 2-cyclohexenethiol and 4-cyclooctenethiol.

The present invention is particularly effective in overcoming the induction period, or in shortening the induction period, during which the reaction of the mercaptan with the unsaturated compound does not take place or is proceeding at a very slow rate at the beginning of the reaction when the materials are contacted at the proper reaction temperature in the presence of the activating radiation. This effect is particularly noticeable when the activating radiation is ultraviolet light and there is present in the reaction mixture as an impurity in the unsaturated hydrocarbon reactant an alicyclic or acyclic conjugated dienehydrocarbon or an aromatic hydrocarbon. Such conjugated diene hydrocarbons include not only the open-chain conjugated dienes such as 1,3-butadiene and isoprene, but also include cyclic-conjugated dienes such as cyclopentadiene. Examples of aromatic hydrocarbons include styrene, naphthalene, benzene, toluene and xylene. For instance, in one series of runs where the olefin reacted was 1-butene containing from 0 to about 3.3 mol percent of 1,3-butadiene, the induction period varied in a straight line relationship for substantially no induction period at 0 mol percent 1,3-butadiene to more than 80 minutes for the maximum amount of butadiene, the series of runs being conducted entirely in the absence of the aromatic thiol promoter of the invention.

Although the invention has been found to be particularly useful where the reaction is effected in the presence of ultraviolet radiation of a wavelength less than 3200 Angstroms, the invention is applicable where the activating radiations are either electromagnetic radiations of a wavelength from 0.004 to 3200 Angstroms or are high energy ionizing particle radiations equivalent to at least 20 electron-volts per particle. This class of radiations includes ultraviolet, X-rays, gamma rays, and particle radiations such as beta-rays, protons, neutrons, deuterons and alpha particle rays. A method of converting the energy level in electron-volts to the corresponding energy level in terms of wavelength is realized with the use of the following equation:

$$\text{Radiation wave length} = \frac{1.24 \times 10^4}{\text{electron-volts}}$$

Authority for this equation may be found by consulting Bovy, Polymer Reviews, "Effects of Ionizing Radiation on Natural and Synthetic High Polymers," Interscience Publishers, Inc., 1958, pages 1 and 2. In the case of ionizing radiations one convenient method of activating the reaction mixture is to expose the mixture to radioactive fission products from an atomic reactor. Other well known sources of such rays are radioactive materials such as cobalt-60. In the case of ultraviolet radiation it is convenient to insert a quartz tube in conjunction with an ultraviolet light generator in a tubular or a stirred reactor.

Thus, the reactants as hereinbefore described are mixed and are exposed to activating radiation as before described in the presence of one of the aromatic thiols of the invention. These promoters are usually employed in an amount from 0.0001 to 2 weight percent of the total reactants. The reactants are usually present in a mol ratio of the unsaturated hydrocarbon reactant to the sulfur containing component of from 1:4 to 4:1. The reaction can be effected in the presence of suitable diluent, if desired, particularly in the case of reactions activated by ultraviolet light. Suitable diluents are, for instance, paraffinic hydrocarbons having 4–16 carbon atoms per molecules such as butanes, pentanes, octanes, decanese, and hexadecanes. The use of such a diluent is not necessary. The reaction is usually carried out in the liquid phase at pressures sufficient to maintain the reactants in the liquid phase. Temperature can vary widely for any given reaction and optimum temperatures vary considerably according to the particular reaction. However, temperatures are usually within the range of −50 to 200° C., more often in the range from 0 to 100° C. Reaction products can be separated by any convenient method. Quite often, distillation is employed to separate the products. Unreacted and separated reactants can, of course, be recycled to further reaction.

In a specific example which is typical of the invention, but not limiting thereof, a series of runs was made in a stainless steel reactor, fabricated from two-inch pipe, approximately six inches long. To admit ultraviolet light, a 23 mm. I.D. quartz tube was sealed into both ends of the reactor so that the reaction solution could be contained in the annular space between the quartz tube and the inside of the steel pipe. The reactor was equipped with a pressure gauge, a thermowell and a cooling coil through which tap water flowed. Inlet tubes with valves were provided in order to charge the reactants.

In each of the runs 56 grams of 1-butene was mixed with 68 grams of hydrogen sulfide. The 1-butene contained 1.4 mol percent 1,3-butadiene. The various runs, except run No. 1, had various amounts of promoters added as shown in Table I.

Table I

| Run No. | Promoter | Amount, wt. percent of Reactants | Induction Period, Min. | Total Conversion of 1-butene [1] | Wt. of Butyl Mercaptan to di-n-Butyl Thioether |
|---|---|---|---|---|---|
| 1 | None | 0 | 38 | 88.0 | 3.3:1 |
| 2 | 2-naphthalenethiol | 0.00048 | 28 | over 85 | |
| 3 | ____do____ | 0.0048 | 22 | over 85 | |
| 4 | ____do____ | 0.081 | 20 | over 85 | |
| 5 | ____do____ | 0.81 | 21 | 89.1 | 3.1:1 |
| 6 | benzenethiol | 0.87 | 30 | 89.2 | 3.1:1 |

[1] Actual conversions were considerably higher since there were losses in distillation tower holdup and other handling losses.

The runs were made in the following manner. The aromatic thiol promoter, if any, was charged first in weighed amount. The olefin was then added, and the reactor was weighed. The reactor was mounted on a shaker and a small excess of hydrogen sulfide was charged. The filled reactor was returned to the balance and the excess hydrogen sulfide was bled off. The reactor was returned to the shaker. A lighted ultraviolet lamp (100 watt) was inserted in the quartz tube and the shaker started. The lamp had been previously lighted since about 5 minutes is required to obtain a steady intensity.

The time the lamp was inserted in the reactor opening was noted as the start of the run. Observations were then made of the pressure and the temperature over a period of time.

For the runs described above the initial temperatures were in the range of 70 to 80° F. The maximum reaction temperatures were below 105° C. Tests had established that within these temperature ranges the reaction rate is not highly dependent upon temperature, and the results are highly reproducible.

In a typical run, as in the present runs, the induction period is characterized by a small initial temperature rise due to the heating effect of the ultraviolet lamp. At the end of the induction period, if any, the temperature rises at a more rapid rate and the pressure decreases. The period from insertion of the ultraviolet lamp to the time when the temperature begins to change rapidly was noted as the induction period.

Table I summarizes the results. Runs 1 through 5 show the effect of increasing the concentration of the 2-naphthalenethiol. Increase in the concentration of the thiol from 0.00048 to 0.081 weight percent of the reactants effects a significant decrease in the induction period. Further increase in the concentration of the thiol to 0.81 percent has little effect. Thus, the additives of this invention are effective at very low concentrations and larger amounts do not have a detrimental effect.

As will be evident to those skilled in the art, various modifications of this invention can be made or followed in the light of the foregoing disclosure and discussion without departing from the spirit and scope of the disclosure or from the scope of the claims.

I claim:

1. In the reaction of a hydrocarbon compound containing at least one nonconjugated multiple carbon to carbon bond selected from an open-chain and a cycloaliphatic hydrocarbon, with a sulfur compound selected from the group consisting of $H_2S$, an aliphatic mercaptan, and a cycloaliphatic mercaptan in the presence of activating radiation having an energy level equivalent to at least 3.9 electron volts, and recovering a reaction sulfur compound product; an improvement comprising the step of providing a promoter in the reaction mixture selected from the group consisting of benzenethiols and naphthalenethiols of the formulas

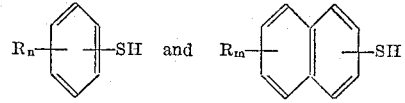

where R is an alkyl group having 1 to 10 carbon atoms, $n$ is an integer from 0 to 5, $m$ is an integer from 0 to 7, and where the total carbon atoms in said thiol is from 6 to 36.

2. In the reaction of a hydrocarbon compound containing at least one nonconjugated multiple carbon to carbon bond selected from an open-chain and a cycloaliphatic hydrocarbon, with a sulfur compound selected from the group consisting of $H_2S$, an aliphatic mercaptan, and a cycloaliphatic mercaptan in the presence of ultraviolet rays having wave-lengths of below 3200 Angstrom units, and recovering a reaction sulfur compound product; an improvement comprising the step of providing a promoter in the reaction mixture selected from the group consisting of benzenethiols and naphthalenethiols of the formulas

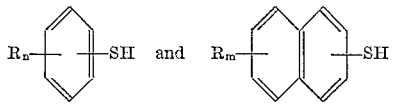

where R is an alkyl group having 1 to 10 carbon atoms, $n$ is an integer from 0 to 5, $m$ is an integer from 0 to 7, and where the total carbon atoms in said thiol is from 6 to 36.

3. The process of claim 2 wherein said sulfur compound is $H_2S$.

4. The process of claim 2 wherein said sulfur compound is an aliphatic mercaptan containing from 1–20 carbon atoms.

5. In the production of a reaction sulfur compound the reaction of a hydrocarbon compound containing at least 1 non-conjugated multiple carbon to carbon bond selected from an olefinic and an acetylenic bond, said compound being selected from an open-chain and a cycloaliphatic hydrocarbon, with a sulfur compound selected from the group consisting of $H_2S$, an aliphatic mercaptan, and a cycloaliphatic mercaptan in the presence of activating radiation having an energy level equivalent to at least 3.9 electron-volts; a step of providing a promoter in the reaction mixture selected from the group consisting of benzenethiols and naphthalenethiols of the formulas

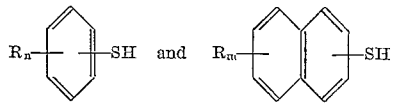

where R is an alkyl group having 1 to 10 carbon atoms, $n$ is an integer from 0 to 5, $m$ is an integer from 0 to 7, and where the total carbon atoms in said thiol is from 6 to 36.

6. Process of claim 1 where said hydrocarbon compound is an open-chain monoolefin.

7. Process of claim 2 where said hydrocarbon compound is an open-chain monoolefin.

8. Process of claim 1 where said sulfur compound is $H_2S$.

9. Process of claim 1 where said sulfur compound is an aliphatic mercaptan containing from 1–20 carbon atoms and the recovered product is a thioether.

10. Process of claim 2 wherein the promoter is benzenethiol.

11. Process of claim 2 wherein the promoter is 2-naphthalenethiol.

12. In the production of a reaction sulfur compound product the reaction of a monoolefin with $H_2S$ in the presence of ultra-violet rays having wave-lengths of below 3200 Angstrom units, and recovering a reaction sulfur compound product; an improvement comprising the step of adding to the reaction mixture from 0.0001 to 2 weight percent of total reactants of a promoter selected from the group consisting of benzenethiols and naphthalenethiols of the formulas

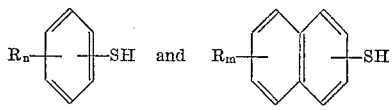

where R is an alkyl group having 1 to 10 carbon atoms, $n$ is an integer from 0 to 5, $m$ is an integer from 0 to 7, and where the total carbon atoms in said thiol is from 6 to 36.

13. Process of claim 12 wherein said monoolefin contains a conjugated diene hydrocarbon as an impurity.

14. Process of claim 1 wherein said monoolefin contains a conjugated diene hydrocarbon as an impurity.

15. Process of claim 2 wherein said monoolefin contains a conjugated diene hydrocarbon as an impurity.

16. Process of claim 2 wherein said hydrocarbon compound contains as an impurity a material having double bonds on adjacent carbon atoms selected from the group consisting of conjugated diene hydrocarbons and aromatic hydrocarbons.

References Cited in the file of this patent
UNITED STATES PATENTS

| | | |
|---|---|---|
| 2,392,294 | Rust et al. | Jan. 1, 1946 |
| 2,398,479 | Vaughan et al. | Apr. 16, 1946 |
| 2,763,593 | Leesemann | Sept. 18, 1956 |
| 2,810,687 | Rueggeberg et al. | Oct. 22, 1957 |
| 2,861,934 | Kern | Nov. 25, 1958 |